April 30, 1940.  E. J. MERCIL  2,198,918
HAND TRUCK
Filed Aug. 7, 1939  2 Sheets-Sheet 2
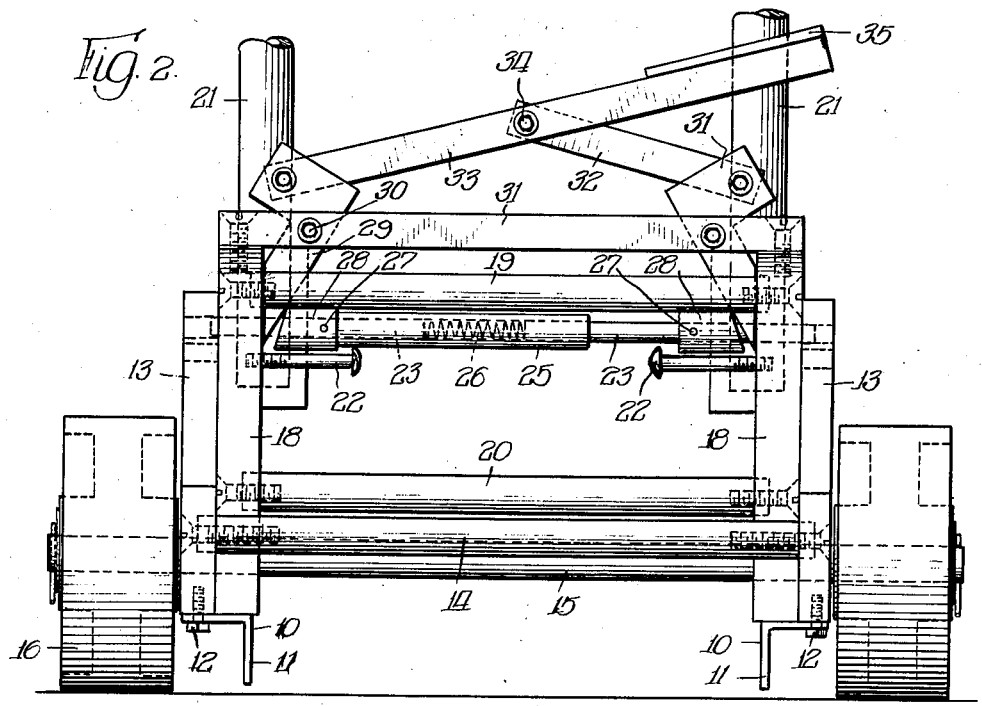
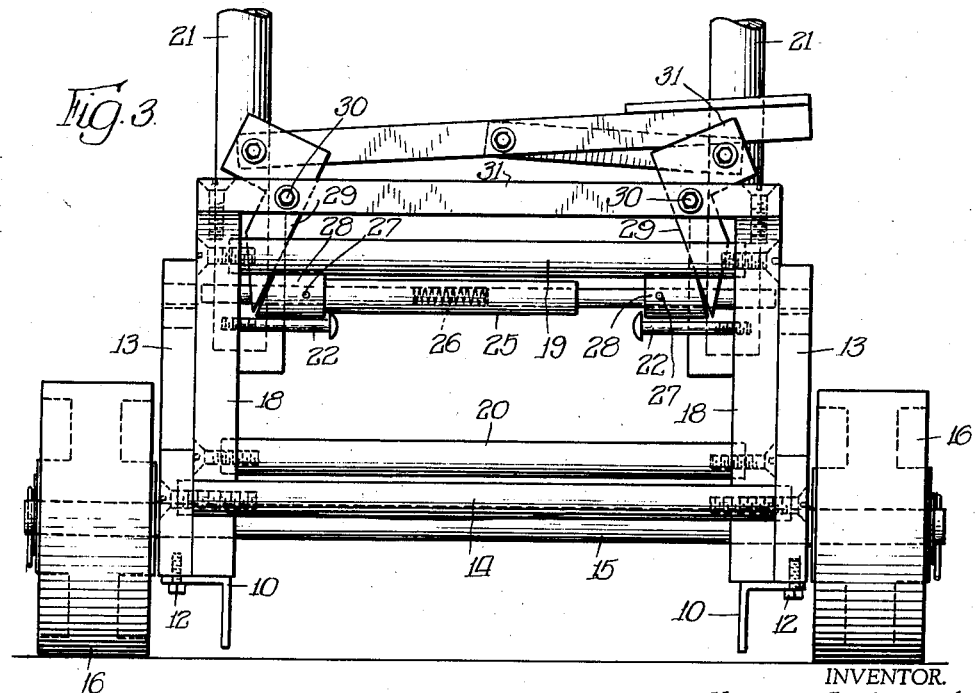
INVENTOR.
Elmer J. Mercil,
BY
ATTORNEY.

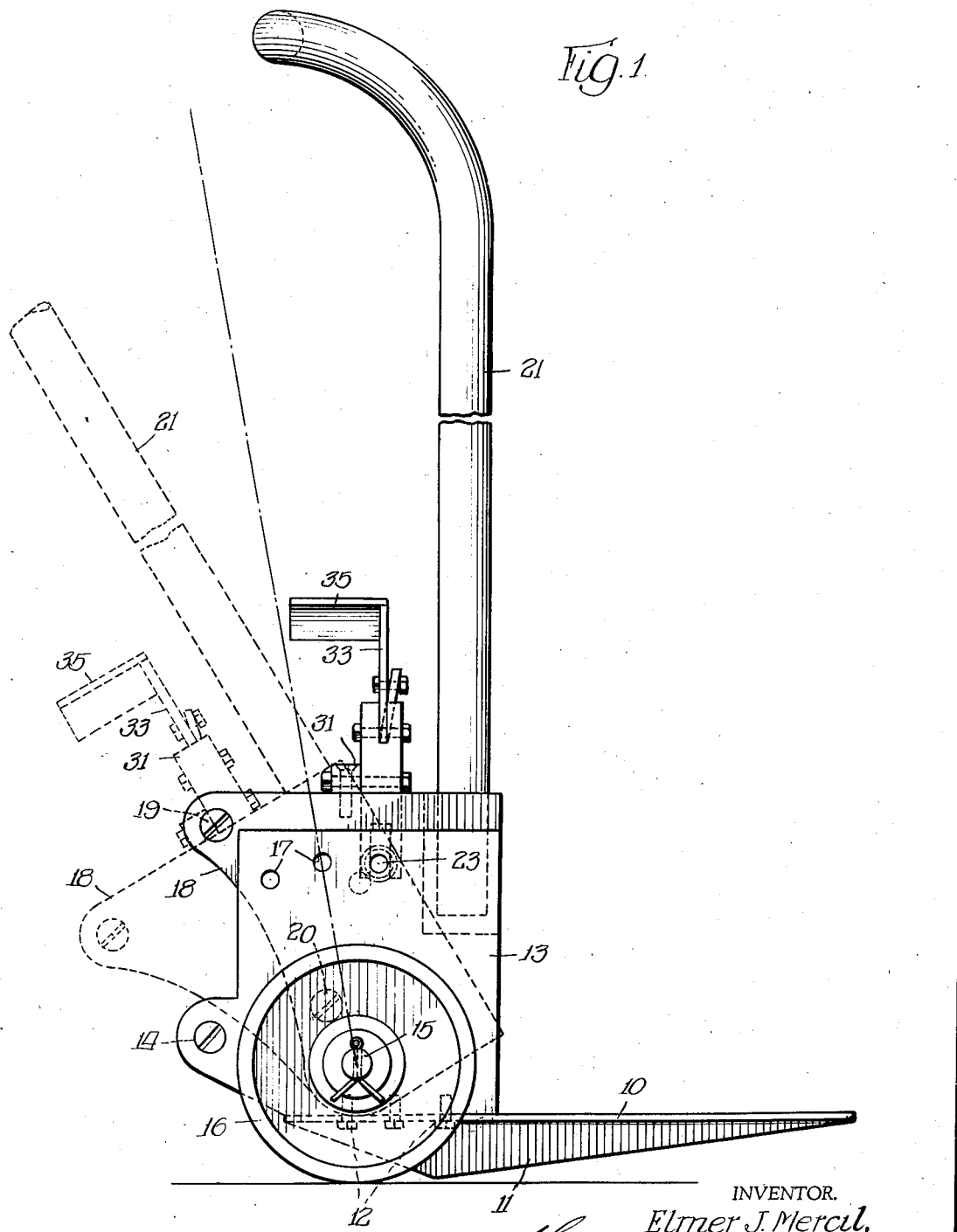

Patented Apr. 30, 1940

2,198,918

UNITED STATES PATENT OFFICE 2,198,918

HAND TRUCK

Elmer J. Mercil, Oak Park, Ill., assignor to Mercil Plating Equipment Company, Chicago, Ill., a corporation of Illinois Application August 7, 1939, Serial No. 288,744

5 Claims. (Cl. 280—56)

My invention relates to trucks of a type intended for use by a single person in handling and conveying heavy barrels, boxes, and the like.

An object of my invention is to provide simple apparatus adapted for the described use, the mechanism being constructed to provide for adjustment to compensate for varying loads that are to be handled. Normally in hand trucks of this character, the operating arms extend vertically when the feet are projected beneath the barrel or case. Thus, in order to lift the load sufficiently to enable it to be tilted into position where it is entirely supported by the truck, a force must be exerted on the operating arms in a nearly horizontal direction, and accordingly the weight of the operator is of little value in exerting the required force. If, however, the arms are angularly repositioned even to the extent of 30 or 40°, the component of the lifting force may be directed largely downwardly, thus increasing the effectiveness of the operator in handling large loads.

In order to accomplish this desirable result, I provide a secondary frame which carries the operating arms, this secondary frame being angularly movable relative to the truck frame and by the use of simple mechanism located in a desired angular position.

The invention will be more readily understood by reference to the accompanying drawings, in which Fig. 1 is a side elevation of a hand truck constructed in accordance with my invention, the movable part of the apparatus being shown in an adjusted position in dotted lines;

Fig. 2 is an elevation of the device with parts in the position shown in Fig. 1; and, Fig. 3 is a similar view with the bolt actuating means shown in retracted position.

In the drawings, it will be seen that I provide a truck frame having feet 10, each provided with a tapered reinforcing flange 11, the feet being secured by bolts 12 to side frames 13. The respective side frames are joined by a transverse rod 14 and by a shaft or axle 15. On the overhung ends of the shaft are mounted the truck wheels 16. The side frame members 13 are provided with a series of angularly arranged openings 17 for engagement by the bolts or detents later to be described.

Mounted within the truck frame is a secondary frame comprising side members 18 pivotally supported on the wheel shaft 15, the respective side members being joined by transverse rods 19 and 20. The side members 18 provide sockets within which the lower ends of the operating arms 21 are seated, the arms being removably held in the sockets by means of the screws 22.

Mounted in suitable openings provided in the side members 18 are a pair of bolts 23 which project oppositely from a sleeve 25, a compression spring 26 acting against the respective ends of the bolts that are confined within the sleeve. Secured to the bolts at a point intermediate their ends by means of pins 27, are lugs 28, the outer faces of which are inclined as shown for engagement by the long legs 29 of a bell crank. The bell crank is pivoted for oscillation on bolts 30 mounted in a cross piece 31 connected at its ends to the side members 18. The short legs 31 of the bell cranks are connected to a pair of links 32, 33 joined at 34, the floating links 33 being extended to provide a treadle 35 for engagement by the foot of the operator.

With the parts in the full line position of Fig. 1, if the workman wishes to transport a heavy object which he finds difficult to lift, he may step on the treadle 35, thereby withdrawing the bolts 23 from one of the openings 17 thereby permitting the rotation of the arms and their supporting frame into the dotted line position of Fig. 1, in which position the bolts will enter the recess to the extreme left as shown in Fig. 1. In this position a much greater force may be exerted by the workman than would be possible with the arms in their vertical position. An intermediate position is indicated by the dot-and-dash center line shown in Fig. 1.

A truck constructed as described will be found useful and adaptable for transporting and handling objects of varying weights and the mechanism for accomplishing the result is simple and economically constructed.

I claim:

1. In a hand truck, the combination of a wheeled truck frame and a wheel-supporting shaft therein, a secondary frame pivoted for rotation about the wheel shaft as a center, an operating arm carried by said secondary frame, and manually operable means for locking said secondary frame to the truck frame in a series of selected angularly related positions.

2. In a hand truck, the combination of a truck frame, a wheel shaft mounted therein and having wheels thereon, an operating arm and a support therefor, said support being pivoted for rotation about the wheel shaft as a center, said support carrying a detent and said truck frame having a series of angularly positioned recesses for engagement by said detent whereby the arm may be positioned in various angular relations to the frame.

3. In a truck, the combination of a wheeled frame having a pair of laterally spaced, vertical frame elements located adjacent to the said wheels, a secondary frame having vertical members located alongside of said vertical elements and angularly movable relative thereto, an operating arm carried by said secondary frame, detents carried by said secondary frame and adapted to engage in angularly arranged recesses in the vertical elements of the truck frame, and means operable by a single member for simultaneously retracting both of said detents.

4. In a hand truck, the combination of a frame and a wheel shaft carried thereby, a pair of operating arms, support members providing sockets for said arms mounted on and adapted for rotation about said wheel shaft, a pair of slidable bolts carried by the respective support members and oppositely movable to engage recesses in the frame members, bell cranks cooperating with said bolts, and a toggle for simultaneously actuating both of said bell cranks.

5. In a hand truck, the combination of a frame and a wheel shaft carried thereby, a pair of operating arms, support members for said arms mounted on and adapted for rotation about said wheel shaft, a pair of slidable bolts carried by the respective support members and oppositely movable to engage recesses in the frame members, bell cranks cooperating with said bolts, and a floating treadle and link constituting a toggle for reversely actuating said bell cranks.

ELMER J. MERCIL.